United States Patent
Asari

(10) Patent No.: US 8,291,952 B2
(45) Date of Patent: Oct. 23, 2012

(54) PNEUMATIC RADIAL TIRE FOR HEAVY LOAD

(75) Inventor: Jyunya Asari, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 601 days.

(21) Appl. No.: 12/516,984

(22) PCT Filed: Oct. 29, 2007

(86) PCT No.: PCT/JP2007/071053
§ 371 (c)(1),
(2), (4) Date: Jun. 25, 2009

(87) PCT Pub. No.: WO2008/072425
PCT Pub. Date: Jun. 19, 2008

(65) Prior Publication Data
US 2010/0059161 A1    Mar. 11, 2010

(30) Foreign Application Priority Data
Dec. 8, 2006 (JP) ................... 2006-331253

(51) Int. Cl.
*B60C 15/00* (2006.01)
*B60C 9/00* (2006.01)
(52) U.S. Cl. .................. 152/539; 152/550; 152/554
(58) Field of Classification Search .................. 152/554, 152/454
See application file for complete search history.

(56) References Cited

U.S. PATENT DOCUMENTS
5,236,031 A    8/1993    Honbo et al.

FOREIGN PATENT DOCUMENTS
| JP | 01-285410 A | 11/1989 |
| JP | 1-317814 | * 12/1989 |
| JP | 04-185510 A | 7/1992 |
| JP | 06-072110 A | 3/1994 |
| JP | 11-227412 A | 8/1999 |
| JP | 2005-199762 A | 7/2005 |
| JP | 2006-199111 A | 8/2006 |
| JP | 2006-218936 A | 8/2006 |

* cited by examiner

*Primary Examiner* — Justin Fischer
(74) *Attorney, Agent, or Firm* — Sughrue Mion, PLLC

(57) ABSTRACT

The object of the present invention is to provide a pneumatic radial tire for heavy load which effectively improve three kinds of durability, i.e., durability of the turn-up portion of the carcass, durability of the rubber layer of the carcass and cut resistance of the carcass cords. A steel radial carcass 12 is composed of main carcass portion 12M and turn-up portions 12E. The tire is fitted on a standard rim 20 and suppose that P1 is a position on the tire outer surface with a radial distance of (R+1.18*Hf) from the central axis of the tire, P2 is a position on the tire outer surface with a radial distance of (R+0.81*Hf) from the central axis of the tire, T1 and T2 are intersections of normal lines drawn from P1 and P2, respectively, to the main carcass portion 12M and the turn-up portion 12E, M1 and M2 are intersections of the normal lines and the main carcass portion 12M. T1, T2, M1 and M2 satisfy given mutual positional relationships.

1 Claim, 5 Drawing Sheets

PNEUMATIC RADIAL TIRE FOR HEAVY LOAD

CROSS REFERENCE TO RELATED APPLICATIONS

This application is a National Stage of International Application No. PCT/JP2007/071053 filed Oct. 29, 2007, claiming priority from Japanese Patent Application No. 2006-331253, filed Dec. 8, 2006, the contents of all of which are incorporated herein by reference in their entirety.

TECHNICAL FIELD

The present invention relates to a pneumatic radial tire for heavy load which improves the durability of its bead portions.

RELATED ART

A pneumatic radial tire for heavy load has been used for trucks, buses, construction vehicles and the like. With an improved technique of a wear resistance and an increased tread volume in recent years, it is an actual condition that a repeated input force applied until the tire is discarded has been increased by about 20% compared with the prior tires. Accordingly, the durability of beads is difficult to be effectively maintained with the prior art technique.

As a countermeasure against this issue, Patent Documents 1 and 2 disclose bead structures capable of improving their durability. The structure disclosed in Patent Document 1, however, involves an adverse effect that the strength of cords is prone to be weak at a turn-up portion of a carcass. Also, the structure disclosed in Patent Document 2 takes measures to prevent cords from being cut at a turn-up portion of a carcass. There is, however, a trade-off between an improvement of the bread resistance of the carcass cords and a prevention of malfunctions of the turn-up portion and the rubber layer of the carcass, so the durability of these three items are not simultaneously improved with taking the relationships between these three items into consideration in Patent Document 2.

Patent Document 1: Japanese Patent Application Laid-open No. 2006-218936 (JP 2006218936 A)

Patent Document 2: Japanese Patent Application Laid-open No. 2006-199111 (JP 2006199111 A)

DISCLOSURE OF THE INVENTION

Accordingly, in view of the above-mentioned facts, it is an object of the present invention to provide a pneumatic radial tire for heavy load which effectively improve three kinds of durability, i.e., durability of the turn-up portion of the carcass, durability of the rubber layer of the carcass and cut resistance of the carcass cords.

The invention according to claim 1 is a pneumatic radial tire for heavy load comprising at least one steel radial carcass composed of a main carcass portion extending in a toroidal shape between a pair of bead cores and turn-up portions turning up along the bead cores from the inner side to the outer side in the radial direction of the tire, wherein the following relationships (1) to (4) are satisfied on condition that the tire is fitted on a standard rim and inflated with an internal pressure of 50 kPa:

5.3% of $SH < W1pt < 6.8\%$ of $SH$     (1);

1.7% of $SH < W1tm < 3.2\%$ of $SH$     (2);

2.8% of $SH < W2tm < 4.3\%$ of $SH$     (3); and 1.0% of $SH < W1pt - W2pt < 3.0\%$ of $SH$     (4), where SH is a tire section height, R is a rim radius, Hf is a height of a rim flange of a standard rim, P1 is a position on the tire outer surface with a radial distance of $(R+1.18*Hf)$ from the central axis of the tire, P2 is a position on the tire outer surface with a radial distance of $(R+0.81*Hf)$ from the central axis of the tire, T1 and T2 are intersections of normal lines drawn from P1 and P2, respectively, to said main carcass portion and said turn-up portions, M1 and M2 are intersections of said normal lines and said main carcass portion, W1*pt* is a distance from P1 to T1, W1*tm* is a distance from T1 to M1, and W2*pt* is a distance from P2 to T2.

As used herein, the term "standard rim" refers to a standard rim for an applied size specified in YEAR BOOK 2006 Edition published by JATMA in Japan, and where the TRA standard or the ETRTO standard is adopted in the place of use or manufacturing, the above-mentioned definition follows such standard.

In the course of complete the invention recited in claim 1, the present inventor examined three kinds of durability, i.e., durability of the turn-up portion of the carcass around the bead core, durability of the rubber layer of the carcass and cut resistance of the carcass cords (filaments). The inventor, then, found that when the tire receives a load to induce collapse deformation, a shear strain of the turn-up portion of the carcass, a shear strain of the rubber layer between the carcass plies and a compression strain of the turn-up portion of the carcass are caused, and repeated input of high shear strain or high compression strain results in a malfunction. In order to decrease levels of these strains, the inventor further conducted the below-mentioned analysis and experiments and examined the followings:

(1) Durability of the Carcass Turn-Up Portion and Durability of the Rubber Layer of the Carcass A separation occurs at a T1 portion, which is a vicinity of T1, of the carcass turn-up portion. This is because when the tire receives a load to induce a collapse deformation, the amount of collapse with a rim flange being its supporting point is large and thus the shear strain maximizes at near T1 portion (see, for example, FIG. 3).

In order to suppress the collapse of T1 portion, it is effective to enlarge the distance between a portion contacting the rim and the T1 portion by increasing W1*pt* and to dispose the turn-up portion (turning ply) close to the main carcass portion (main ply) where the tensile force is large even under load by decreasing the W1*tm* (see, for example, FIG. 4), which can reduce the shear strain of the T1 portion.

It is noted that an excessive increase of W1*pt* may decrease the durability due to an increase of the amount of heat generated, so that it is necessary to set up acceptable limits. In particular, when W1*pt* is smaller than 5.3% of SH or W1*tm* is larger than 3.2% of SH, enough durability of the carcass turn-up portions cannot be ensured for a user demanding a severe service condition (heavy load or the like).

When W1*tm* is smaller than 1.7% of SH, the shear stress of the rubber layer of the carcasses is increased, and the separation of the rubber layer of the carcass occurs prior to a separation of the carcass turn-up portion, so that this 1.7% is a limit under existing conditions. Accordingly, the relationship, 1.7% of SH<W1tm<3.2% of SH is a requisite limitation.

Meanwhile, when the above-mentioned relationship is satisfied but W1*pt* is larger than 6.8% of SH, the temperature of the bead portion is raised more than that of the conventional tire. Therefore, the relationship, 5.3% of SH<W1pt<6.8% of SH is a further requisite limitation.

(2) Cut Resistance of Carcass Cords (Filaments)

The tire receive a load to induce a collapse deformation of the bead portion and the like outward of the tire, but if the turn-up portion of the carcass is arranged in a region approximate to a neutral plane of the bending deformation (the main carcass), the amount of a compression force applied to the turn-up can be reduced to suppress the compression strain.

In particular, important is the inter-carcass gauge thickness from the upper face of the bead core to the W1$tm$ portion where the rubber thickness between the main carcass portion and the turn-up portion is generally uniform. Squeezing a case line at the W2$tm$ portion which is a approximate middle portion between the upper face of the bead core and the W1$tm$ portion, i.e., narrowing the clearance between the path lines of the carcass decreases the amount of the compression force applied from the bead core to the turn-up portion, which increases the amount of reduction in the compression strain.

It is noted that excessive reduction of W2$tm$ will decreases the rigidity of a rubber portion disposed between the main carcass portion and the turn-up portion and increases the amount of collapse under load to deteriorate the durability of the carcass turn-up portion, so that an acceptable limit should be determined.

In addition, it is difficult in terms of tire manufacturing to form a carcass path line L1 (see FIG. 5) and a carcass path line L2 (see FIG. 6) which are locally deformed to a large extent, so that when the W2$tm$ portion is narrowed, an acceptable limit for the relationship between W1$pt$ and W2$pt$ should be determined.

Specifically, if W2$tm$ is larger than 4.3% of SH, the cut resistance of cords is deteriorated than that of the conventional product. If the relationships (1) and (2) are satisfied, but W2$tm$ is smaller than 2.8% of SH, the amount of collapse under load increases to deteriorate the shear strain, which cannot ensure sufficient durability of the carcass turn-up portion for a user demanding a severe service conditions. Therefore, the relationship, $$2.8\% \text{ of } SH < W2tm < 4.3\% \text{ of } SH$$

is a requisite limitation.

Due to a manufacturing limitation, W1$pt$–W2$pt$ smaller than 1.0% of SH gives the carcass path line L1 as shown in FIG. 5, while W1$pt$–W2$pt$ larger than 3.0% of SH gives the carcass path line L2 as shown in FIG. 6. Accordingly, the relationship, $$1.0\% \text{ of } SH < W1pt - W2pt < 3.0\% \text{ of } SH$$

is a requisite limitation.

In this way, the invention recited in claim 1 can improve three kinds of durability, i.e., durability of the turn-up portion of the carcass around the bead core, durability of the rubber layer of the carcass and cut resistance of the carcass cords without using an additional component by altering the carcass path line around the bead portion, thereby providing a pneumatic radial tire for heavy load with a longer lifetime.

Effect of the Invention

According to the present invention, the pneumatic radial tire for heavy load can have three kinds of durability, i.e., durability of the turn-up portion of the carcass around the bead core, durability of the rubber layer of the carcass and cut resistance of the carcass cords.

DESCRIPTION OF THE SYMBOLS 10 pneumatic radial tire for heavy load
12 steel radial carcass
12E turn-up portion
12M main carcass portion
20 rim (standard rim)

BEST MODE FOR CARRYING OUT THE INVENTION

Figure 1:
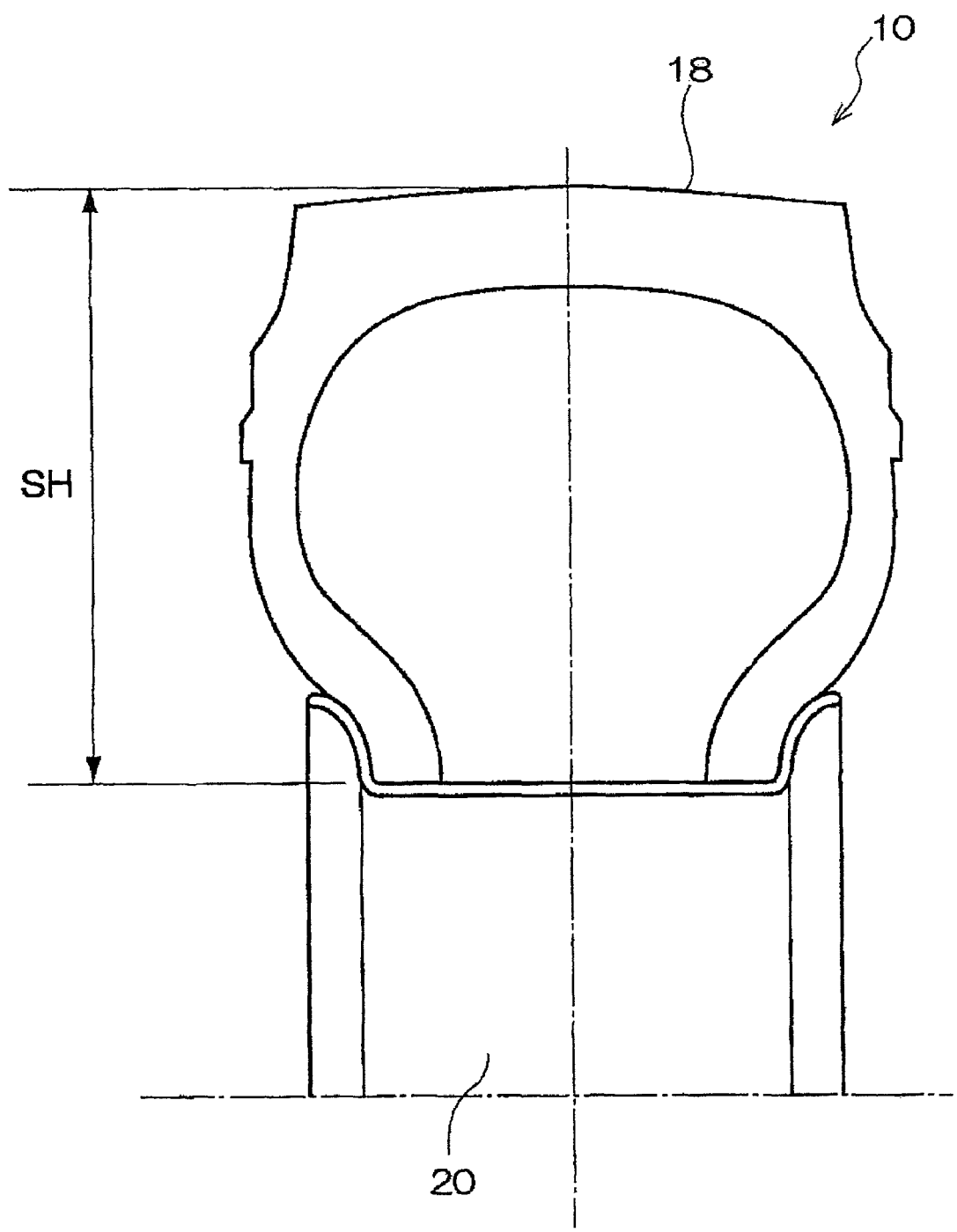
FIG. 1 is a sectional view in the tire radial direction of a pneumatic radial tire for heavy load according to one embodiment of the present invention.
Figure 2:
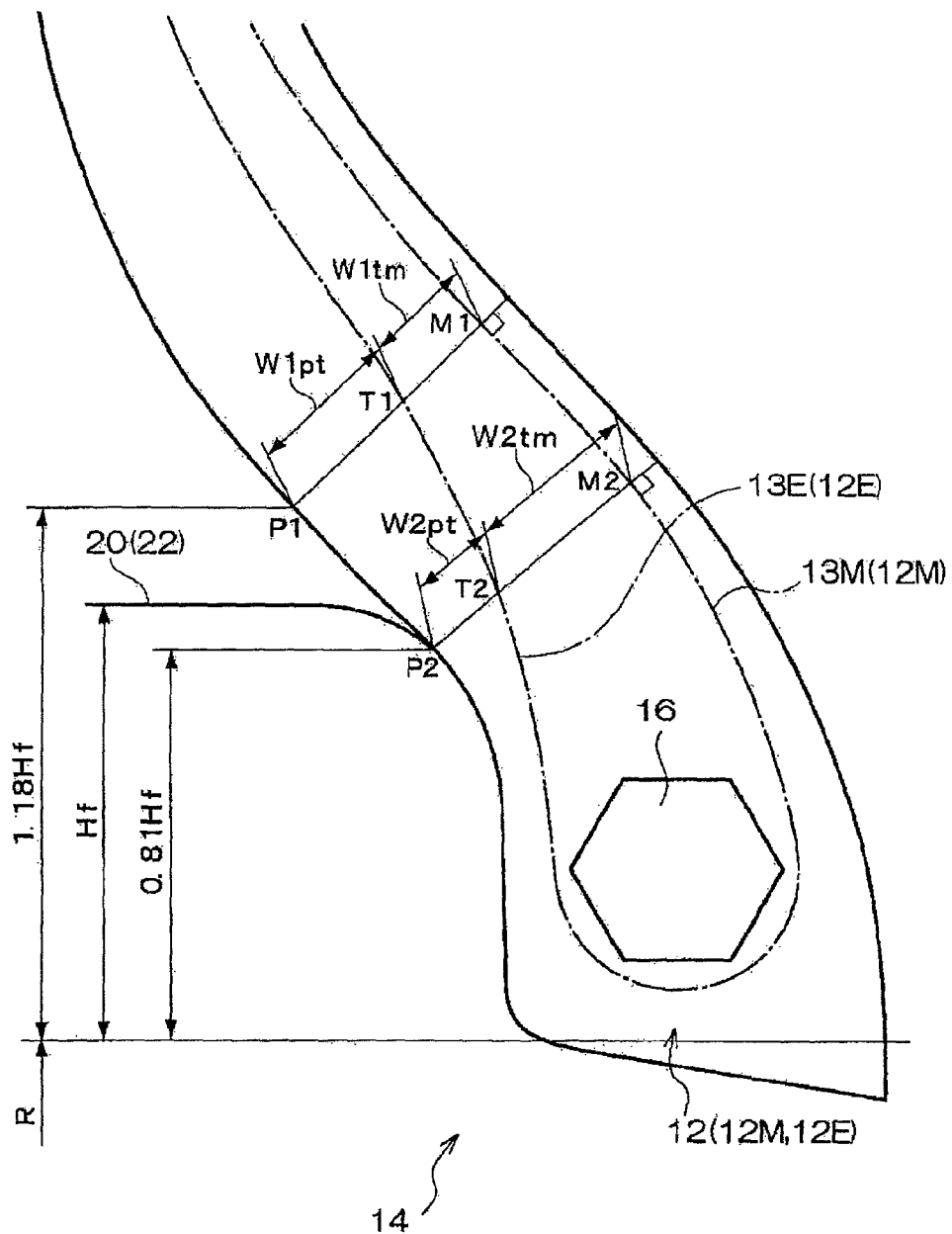
FIG. 2 is a sectional view of a bead portion of a pneumatic radial tire for heavy load according to one embodiment of the present invention.

Hereinafter embodiments of the present invention are discussed. As shown in FIGS. 1 and 2, a pneumatic radial tire 10 for heavy load according to one embodiment of the present invention is provided with a steel radial carcass ply 12 (hereinafter referred to simply as carcass 12). The carcass 12 has a main carcass portion 12M toroidally extending between bead cores 16 of bead portions 14, and a turn-up portion 12E turning up along the bead cores 16 from the inner side to the outer side in the radial direction of the tire. A belt constituting of multiple layers of belt layers is disposed on the outer circumferential side of the crown portion and a tread 18 provided with grooves is formed on the belt in the outer side in the tire radial direction. It is noted that the profile ratio of the pneumatic radial tire 10 is 90% or more in this embodiment.

In this embodiment, as shown in FIG. 2, positions and distances are defined in the following manner.

R is a radius of a standard rim 20, Hf is a height of a rim flange 22, P1 is a position on the tire outer surface with a radial distance of (R+1.18*Hf) from the central axis of the tire, and P2 is a position on the tire outer surface with a radial distance of (R+0.81*Hf) from the central axis of the tire. T1 and T2 are intersections of normal lines drawn from P1 and P2, respectively, to a carcass path line 13M of the main carcass portion 12M (hereinafter, referred to as main carcass path line) and a carcass path line 13E of the turn-up portion 12 E (hereinafter referred to as a turn-up carcass path line), and M1 and M2 are intersections of the normal lines and the main carcass path line 13M. W1$pt$ is a distance from P1 to T1, W1$tm$ is a distance from T1 to M1, and W2$pt$ is a distance from P2 to T2.

The present embodiment satisfies the following relationships (1) to (4).

$$5.3\% \text{ of } SH < W1pt < 6.8\% \text{ of } SH \quad (1);$$

$$1.7\% \text{ of } SH < W1tm < 3.2\% \text{ of } SH \quad (2);$$

$$2.8\% \text{ of } SH < W2tm < 4.3\% \text{ of } SH \quad (3); \text{ and}$$

$$1.0\% \text{ of } SH < W1pt - W2pt < 3.0\% \text{ of } SH \quad (4),$$

As the relationship (1) is satisfied, the durability of the carcass turn-up portion can be improve without rising of the temperature at the bead portion 14 from that of the conventional tire. As the relationship (2) is satisfied, the durability of the carcass rubber layer is equal to or more than that of the conventional tire and the durability of the carcass turn-up portion can be improved. In addition, as the relationship (3) is satisfied, the cut resistance of carcass cords and the durability of the carcass turn-up portion can be improved. Further, as the relationship (4) is satisfied, the main carcass path line 13M and the turn-up carcass path line 13E can take shapes available in terms of tire manufacturing even in a case that W2*tm* is small.

Accordingly, all of the durability of the carcass turn-up portion, the durability of the rubber layer of the carcass 12 and the cut resistance of the carcass cords can be improved, so that a pneumatic radial tire 10 for heavy load with a longer lifetime can be provided. In other words, as compared with the conventional tire, all of the above-mentioned three kinds of durability can be improved simply by altering the carcass path line around the bead portion 14 without using an additional component. It is noted that the carcass path line around the bead core largely affects an improvement of the cut resistance of carcass cords (filaments) and the present embodiment utilizes this fact to realize an effective improvement of the cut resistance of carcass cords.

ANALYSIS EXAMPLE

In order to confirm the effect of the present invention, the inventor carried out analytical calculation of strain caused in a tire under load with FEM (Finite Element Method) to evaluate strain resistance for one example of a pneumatic radial tire 10 for heavy load of the above-mentioned embodiment (hereinafter referred to as ET), one example of a pneumatic radial tire for heavy load of the conventional tire (hereinafter referred to as CT) and four examples of pneumatic radial tire for heavy load for comparison (hereinafter referred to as RT 1-4).

In these analysis examples, all the tires are for a construction vehicle (OR tire) and have a size of 46/90R57.

Conditions of each of the bead portion in this analysis example are shown in Table 1.

TABLE 1

| | | CT | RT 1 | RT 2 | RT 3 | RT 4 | ET |
|---|---|---|---|---|---|---|---|
| Tire condition | W1pt (ratio to SH) | 5.0% | 5.2% | 6.2% | 6.2% | 6.8% | 6.2% |
| | W1tm (ratio to SH) | 3.3% | 3.2% | 2.3% | 1.6% | 3.2% | 2.3% |
| | W2tm (ratio to SH) | 4.2% | 5.4% | 2.5% | 3.9% | 3.9% | 3.9% |
| | W1pt-W2pt (ratio to SH) | 1.8% | 2.6% | 2.7% | 1.1% | 2.9% | 2.4% |
| Evaluation index for strain | Shear strain of carcass turn-up portion | 100 | 92 | 88 | 79 | 78 | 81 |
| | Shear strain of carcass rubber layer | 100 | 100 | 95 | 110 | 95 | 99 |
| | Compression strain of carcass cord | 100 | 150 | 70 | 80 | 85 | 82 |
| Evaluation result from drum test | Heat generation of bead portion | — | Close to CT | Close to CT | Close to CT | CT + 6 deg C. | Close to CT |
| | Troubles in bead portion | Abort due to a separation at carcass turn-up portion | Abort due to cut of a carcass cord | Complete but small separation found in carcass turn-up portion | Complete but a crack found in carcass rubber layer | Complete but small separation found in carcass turn-up portion | Complete with no trouble |
| | Traveling time (H) | 400 | 450 | 500 | 500 | 500 | 500 |

In this analysis example, strains were calculated with FEM in a condition that all tires were fitted on a standard rim (TRA) and the specified internal pressure (TRA) and the specified load (TRA) were applied. Suppose an evaluation index for the conventional tire is 100, evaluation indexes for the other tires, which were values relative to the index for the conventional tire, were calculated. The results are shown in Table 1 as well. Regarding the strain in Table 1, the smaller evaluation index represents the better performance.

As can be seen from Table 1, the Embodiment Tire (ET) has better evaluation indexes in all of shear strain of the carcass turn-up portion, shear strain of the carcass rubber layer and compression strain of the carcass cord.

Figure 3:
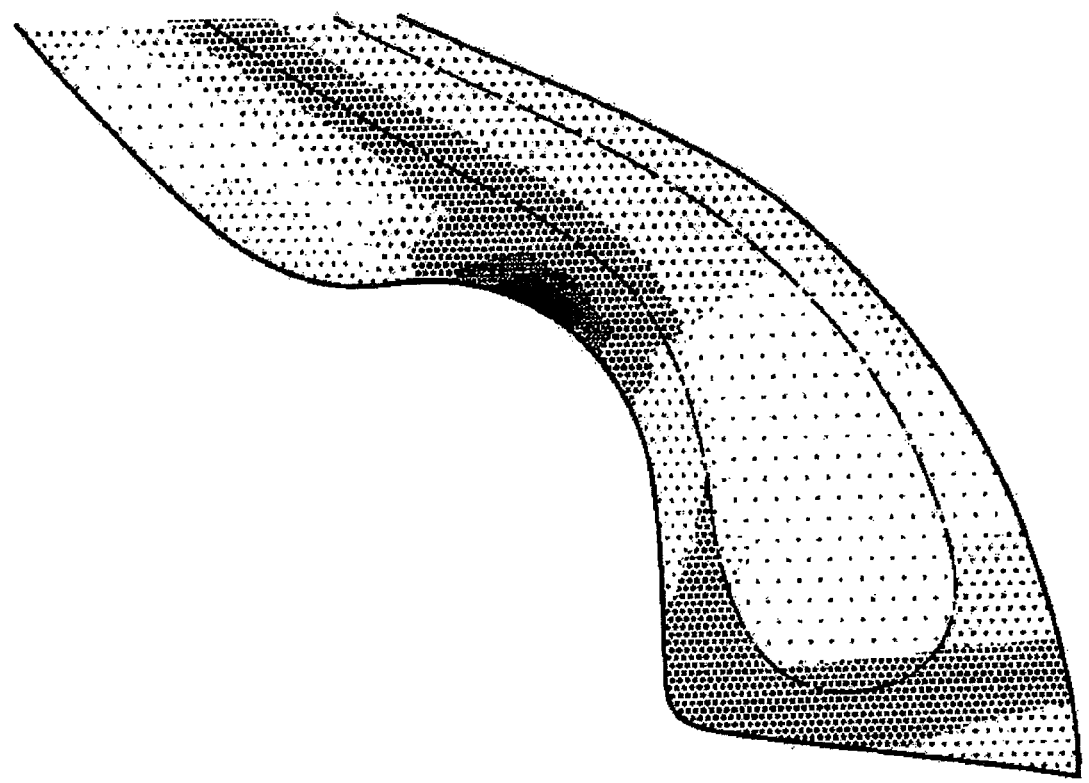
FIG. 3 is an analytic modeling view of an analytic example showing a distribution of shear strain in the bead portion, where the higher density of dots refer the larger shear strain.
Figure 4:
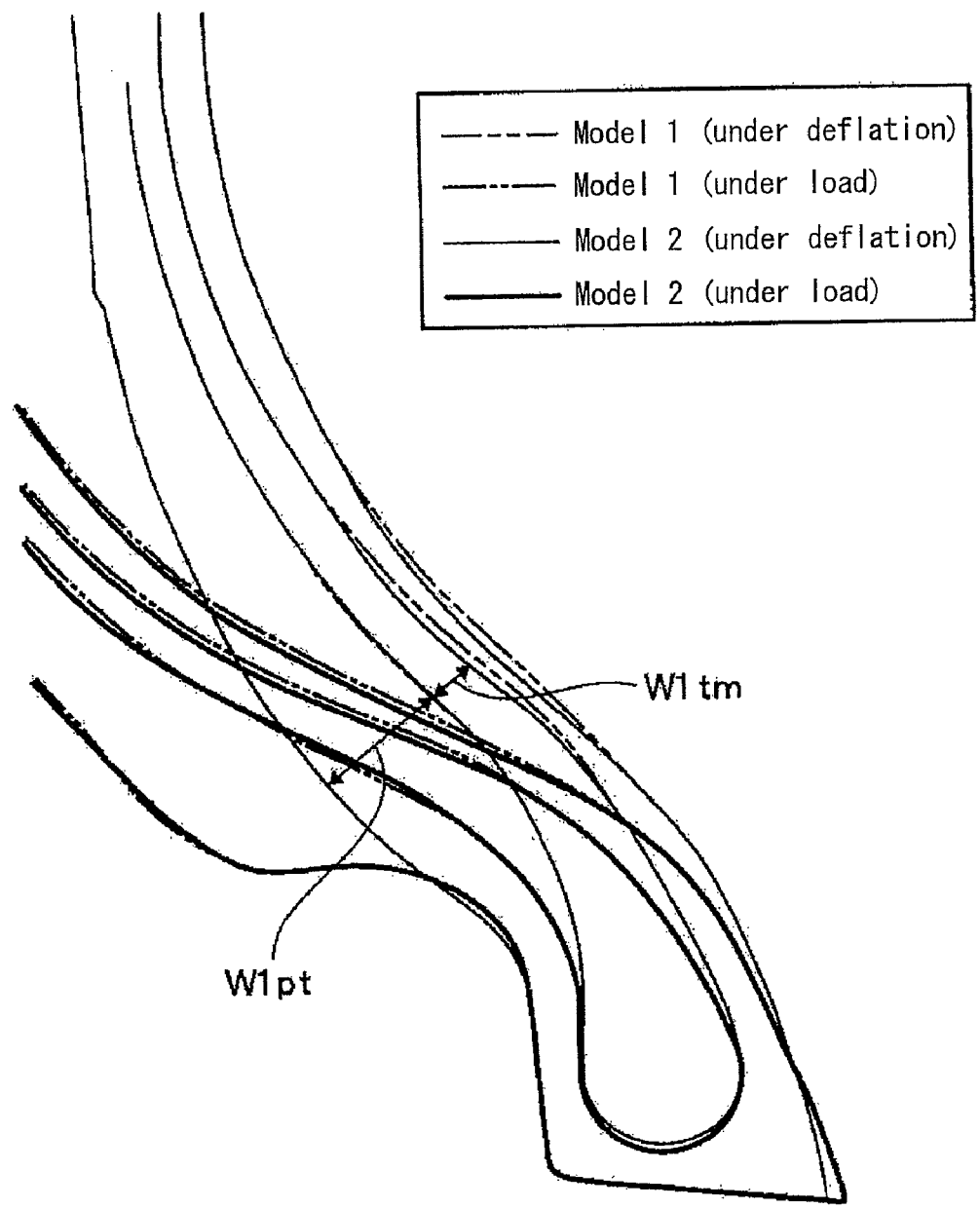
FIG. 4 is an analytic modeling view of an analytic example showing the shape of the bead portion under load.
Figure 5:
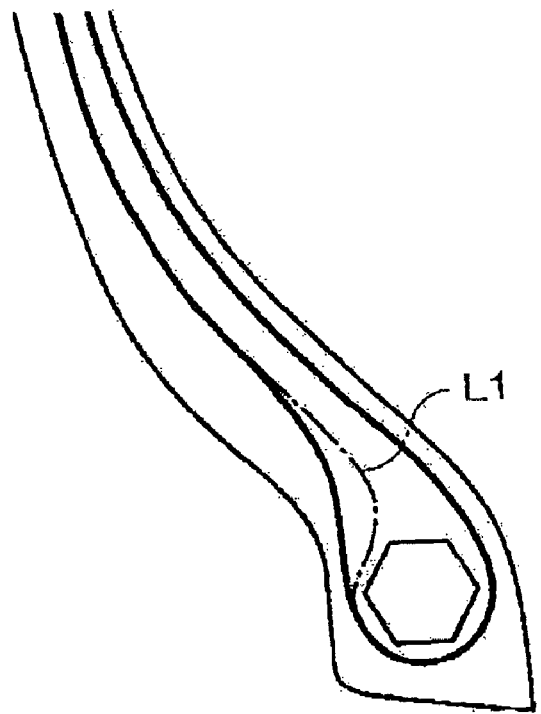
FIG. 5 is a sectional view of the bead portion showing an example of the shape of the carcass path line which is difficult to realize in terms of manufacturing a tire.
Figure 6:
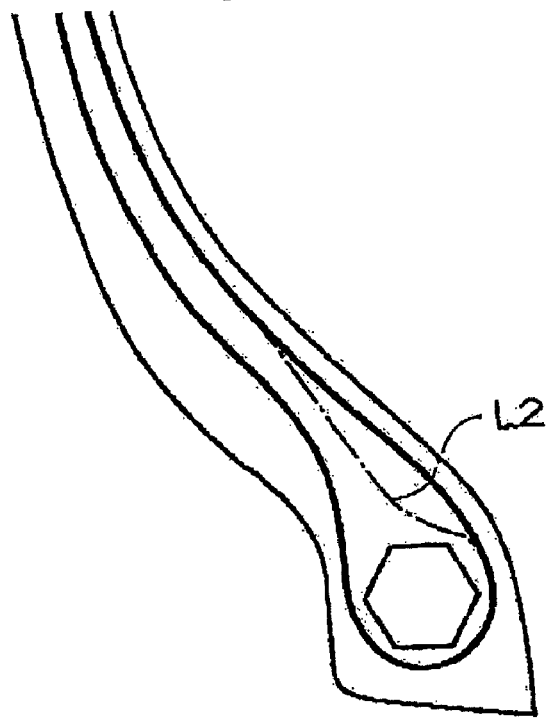
FIG. 6 is a sectional view of the bead portion showing an example of the shape of the carcass path line which is difficult to realize in teens of manufacturing a tire.

In addition, it is confirmed in this analysis example that when the tire receives a load to induce collapse deformation, the amount of collapse toward the rim flange 22 is the maximum and the shear strain is maximized at the T1 portion, as shown in FIG. 3.

Further, it is also confirmed in this analysis example that as compared to the model 1 which is the Conventional tire, the model 2 which has small W1*tm* as with the present invention can reduce the collapse of the T1 portion under deflation (internal pressure: 50 kPa) and thus can reduce the shear strain. Note that the models 1 and 2 have the same W1*pt*.

EXAMPLES

In order to confirm the effect of the present invention, the inventor actually manufactured the above-mentioned Embodiment tire, Reference tires and Conventional tire, and conducted a durability test of a bead portion to evaluate the durability.

In these examples, all the tires were fitted on the standard rim and then the temperature of the bead portion was measured under a condition that the specified internal pressure and 100% of the specified load (TRA) were applied, traveling speed was 8 km/h and the drum diameter was 5 meters. The measurement results are shown in Table 1 as well.

Then, 170% of the specified load (TRA) was applied and the drum test was performed for 500 hours. Either of a case that the test could be performed for 500 hours and a case that the test could be performed only less than 500 hours, the bead portions were taken apart to evaluate troubles in the bead portions. The results are shown in Table 1 as well.

As can be seen form Table 1, Example tire and Reference tires 1-4 had longer traveling time than Conventional tire. Further, Example tire and Reference tires 2-4 could travel for 500 hours.

Example tire sufficiently satisfied all of the three kinds of durability, i.e., 1) durability of the turn-up portion of the carcass around the bead core, 2) durability of the rubber layer of the carcass and 3) cut resistance of the carcass cords (filaments).

The embodiments of the present invention have been discussed by way of example, but these embodiments are merely examples and the present invention can be altered as far as it is not depart from the gist of the invention. In addition, the scope of the present invention is, of course, not limited to the above-discussed embodiments.

The invention claimed is:

1. A pneumatic radial tire for heavy load comprising at least one steel radial carcass composed of a main carcass portion extending in a toroidal shape between a pair of bead cores and turn-up portions turning up along the bead cores from the inner side to the outer side in the radial direction of the tire, wherein the following relationships are satisfied on condition that the tire is fitted on a standard rim and inflated with an internal pressure of 50 kPa:

$5.3\%$ of SH<W1pt<$6.8\%$ of SH;

$1.7\%$ of SH<W1tm<$3.2\%$ of SH;

$2.8\%$ of SH<W2tm<$4.3\%$ of SH; and $1.0\%$ of SH<W1pt-W2pt<$3.0\%$ of SH, where SH is a tire section height, R is a rim radius, Hf is a height of a rim flange of a standard rim, P1 is a position on the tire outer surface with a radial distance of (R+1.18*Hf) from the central axis of the tire, P2 is a position on the tire outer surface with a radial distance of (R+0.81*Hf) from the central axis of the tire, T1 and T2 are intersections of normal lines drawn from P1 and P2, respectively, to said main carcass portion and said turn-up portion, M1 and M2 are intersections of said normal lines and said main carcass portion, W1pt is a distance from P1 to T1, W1tm is a distance from T1 to M1, W2tm is a distance from T2 to M2, and W2pt is a distance from P2 to T2; and wherein the turn-up portions extend radially outward of the point P1, and wherein the following relationship is satisfied on condition that the tire is fitted on a standard rim and inflated with an internal pressure of 50 kPa:

W1tm <W2tm.

* * * * *